United States Patent
Lee et al.

(10) Patent No.: US 9,759,965 B2
(45) Date of Patent: Sep. 12, 2017

(54) LIQUID CRYSTAL DISPLAY

(71) Applicant: Samsung Display Co., Ltd., Yongin (KR)

(72) Inventors: Gak Seok Lee, Hwaseong-si (KR); Byoung-Hun Sung, Hwaseong-si (KR); Duck Jong Suh, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 75 days.

(21) Appl. No.: 14/802,744

(22) Filed: Jul. 17, 2015

(65) Prior Publication Data
US 2016/0154287 A1  Jun. 2, 2016

(30) Foreign Application Priority Data

Nov. 28, 2014  (KR) ........................ 10-2014-0168657

(51) Int. Cl.
| | |
|---|---|
| G02F 1/1345 | (2006.01) |
| G02F 1/1337 | (2006.01) |
| G02F 1/1362 | (2006.01) |
| G02F 1/1343 | (2006.01) |

(52) U.S. Cl.
CPC ........ *G02F 1/1345* (2013.01); *G02F 1/13624* (2013.01); *G02F 1/133707* (2013.01); *G02F 2001/134345* (2013.01)

(58) Field of Classification Search
CPC .......................... G02F 1/136286; G02F 1/1339
See application file for complete search history.

(56) References Cited

U.S. PATENT DOCUMENTS

| | | | |
|---|---|---|---|
| 5,153,754 A * | 10/1992 | Whetten | C23F 1/26 257/59 |
| 6,762,817 B2 | 7/2004 | Lee et al. | |
| 7,609,354 B2 * | 10/2009 | Konno | G02F 1/1345 349/149 |
| 7,714,974 B2 | 5/2010 | Lee et al. | |
| 8,111,342 B2 | 2/2012 | Kang et al. | |
| 8,294,868 B2 | 10/2012 | Lee | |
| 8,780,311 B2 * | 7/2014 | Ogasawara | G02F 1/1339 349/149 |
| 2003/0035081 A1 * | 2/2003 | Jung | G02F 1/13458 349/152 |
| 2007/0242202 A1 * | 10/2007 | Kawase | H01L 27/3244 349/139 |
| 2008/0018845 A1 * | 1/2008 | Choi | G02F 1/133377 349/143 |
| 2011/0128481 A1 | 6/2011 | Lin et al. | |
| 2016/0103349 A1 * | 4/2016 | Park | G02F 1/133512 349/42 |

FOREIGN PATENT DOCUMENTS

| | | |
|---|---|---|
| JP | 10-054991 | 2/1998 |
| KR | 10-2008-0001536 | 1/2008 |
| WO | 2009/104930 | 8/2009 |

* cited by examiner

*Primary Examiner* — Timothy L Rude
(74) *Attorney, Agent, or Firm* — H.C. Park & Associates, PLC

(57) ABSTRACT

A liquid crystal device includes: a display area comprising pixels; a peripheral area disposed at an edge of the display area; a common voltage application wiring configured to transfer a common voltage; and a data voltage application wiring configured to transfer a data voltage. A ratio of a width of the common voltage application wiring and a width of the data voltage application wiring is in a range of 2:1 to 1:1.

12 Claims, 15 Drawing Sheets

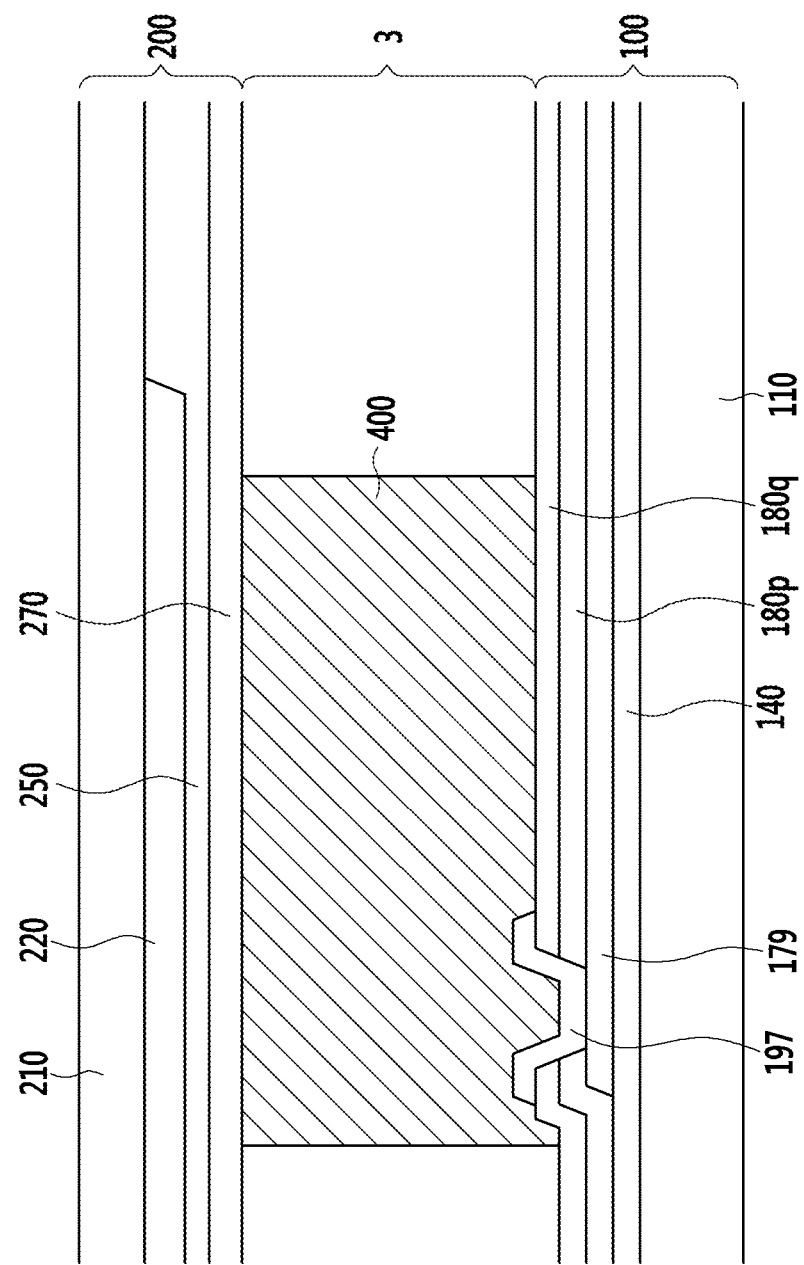

LIQUID CRYSTAL DISPLAY

CROSS-REFERENCE TO RELATED APPLICATION

This application claims priority from and the benefit of Korean Patent Application No. 10-2014-0168657, filed on Nov. 28, 2014, which is hereby incorporated by reference for all purposes as if fully set forth herein.

BACKGROUND

Field

Exemplary embodiments relate to a liquid crystal display.

Description

A general liquid crystal display (LCD) includes two display panels and a liquid crystal layer having dielectric anisotropy interposed therebetween. An electric filed is applied to the liquid crystal layer and intensity of the electric field is controlled to control transmittance of light transmitted through the liquid crystal layer, thereby making it possible to produce a desired image. The above-mentioned liquid crystal display is an example of flat panel displays (FPDs) capable of being easily carried by users. Among these, a TFT-LCD using a thin film transistor (TFT) as a switching element is mainly used.

The display panel on which the thin film transistor is disposed has a plurality of gate lines and data lines formed in row and column directions, and a pixel electrode formed to be connected to the gate lines and the data lines through the thin film transistor. The thin film transistor controls a data signal transferred through the data line in response to a gate signal transferred through the gate line and transmits the data signal to the pixel electrode.

As technologies of the liquid crystal display have been developed and evolved, a need for a display having a reduced width of a bezel has been increased. Consequently, a research on a display having a narrow bezel has been practiced.

The above information disclosed in this Background section is only for enhancement of understanding of the background of the invention and therefore it may contain information that does not form the prior art that is already known in this country to a person of ordinary skill in the art.

SUMMARY

Exemplary embodiments provide a liquid crystal display having a narrow bezel. One or more exemplary embodiments may provide advantages of removing contamination of a liquid crystal layer and a light leakage problem caused by a non-uniform curing of a sealant.

One or more exemplary embodiments provides a liquid crystal display, including: a display area including pixels; a peripheral area disposed at an edge of the display area; a common voltage application wiring configured to transfer a common voltage; and a data voltage application wiring configured to transfer a data voltage. A ratio of a width of the common voltage application wiring and a width of the data voltage application wiring is in a range of 2:1 to 1:1.

One or more exemplary embodiments provides a liquid crystal display, including: a display area including pixels; a peripheral area disposed to surround the display area; a first common voltage application wiring configured to transfer a common voltage; a second common voltage application wiring adjacent to the first common voltage application wiring and configured to transfer the common voltage; a common voltage application slit including a space between the first and second common voltage application wirings; a first data voltage application wiring configured to transfer a data voltage; and a second data voltage application wiring adjacent to the first data voltage application wiring and configured to transfer a data voltage; a data voltage application slit including a space between the first and second data voltage application wirings. A ratio of a width of the common voltage application slit and a width of one of the first and second common voltage application wirings is larger than a ratio of a width of the data voltage application slit and a width of one of the first and second data voltage application wirings.

One or more exemplary embodiments provides a liquid crystal display, including: a display area including pixels; a peripheral area including a signal pad and a common voltage pad; common voltage application wiring pieces configured to transfer a common voltage, the common voltage application wiring pieces being connected to the common voltage pad; a common voltage application slit, which is a space between two adjacent common voltage application wiring pieces; signal voltage application wiring pieces configured to transfer a signal voltage, the signal voltage application wiring pieces being connected to the signal pad; and a signal voltage application slit, which is a space between two adjacent signal voltage application wiring pieces. A ratio of a width of the common voltage application slit and a width of one of the common voltage application wiring pieces is larger than a ratio of a width of the signal voltage application slit and a width of one of the signal voltage application wiring pieces.

According to one or more exemplary embodiments, a liquid crystal display may allow a sealant bonding two display panels to be uniformly cured on an overall surface of the display, thereby making it possible to prevent or reduce the light leakage phenomenon caused by the non-uniform curing.

BRIEF DESCRIPTION OF THE DRAWINGS

FIG. 3 is a cross-sectional view of a data voltage application unit, according to one or more exemplary embodiments.

DETAILED DESCRIPTION OF THE ILLUSTRATED EMBODIMENTS

Figure 1:
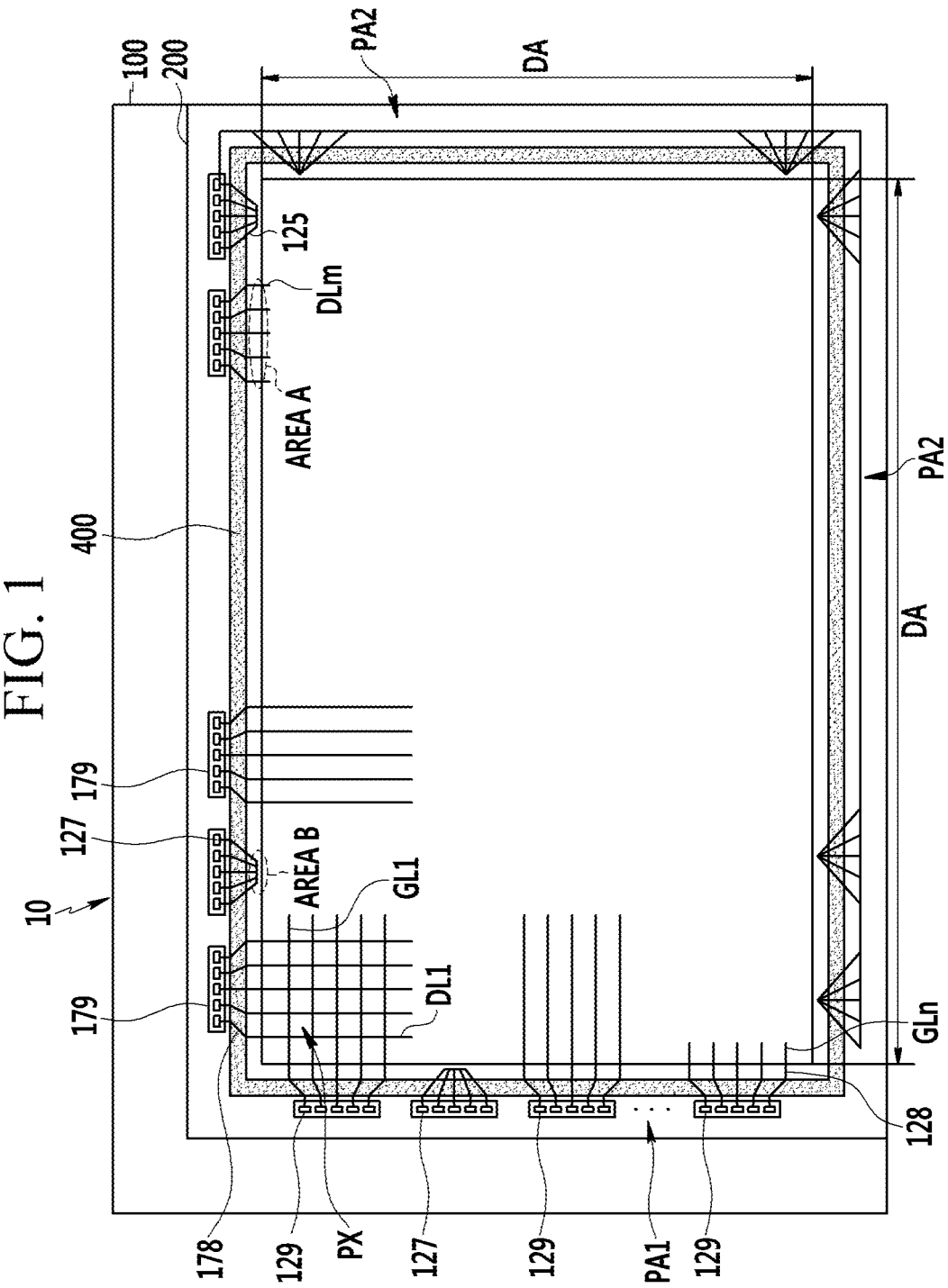
FIG. 1 is a plan view of a display, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
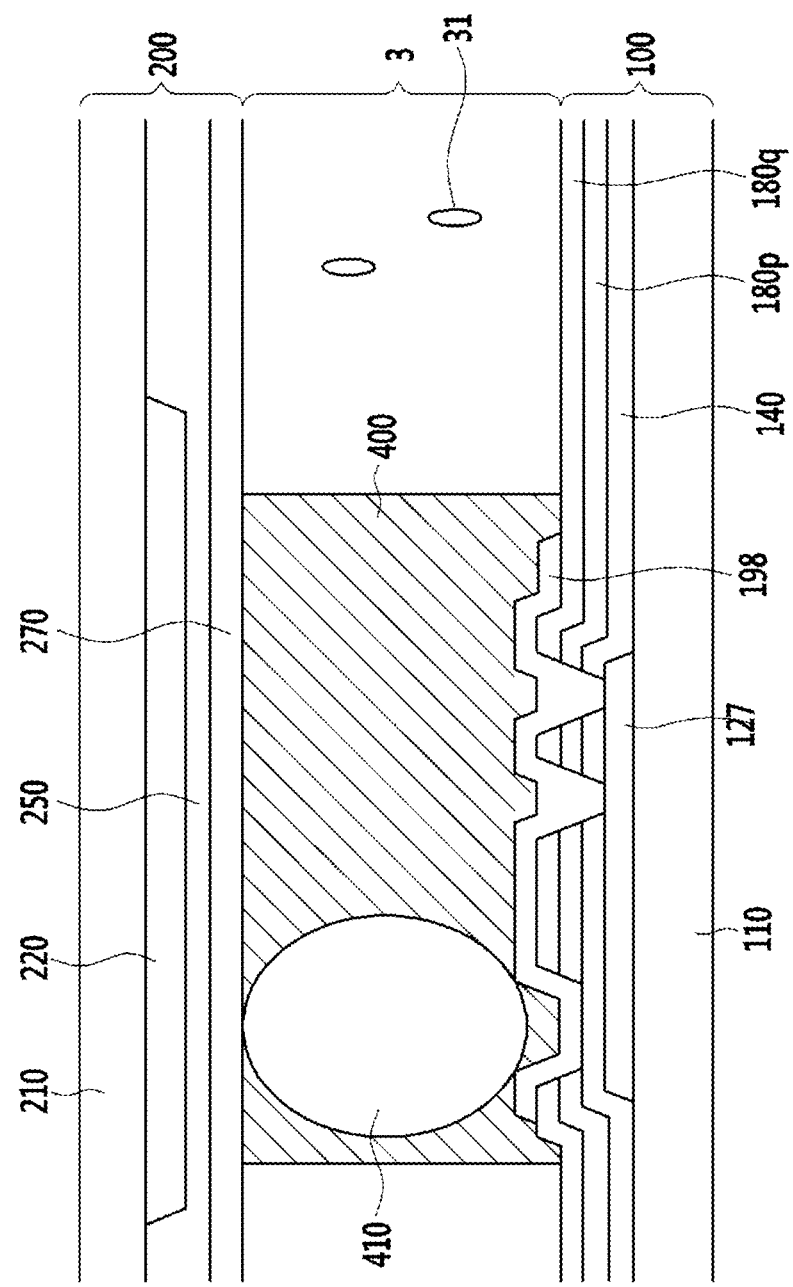
FIG. 2 is a cross-sectional view of a common voltage application unit, according to one or more exemplary embodiments.
Figure 4A:
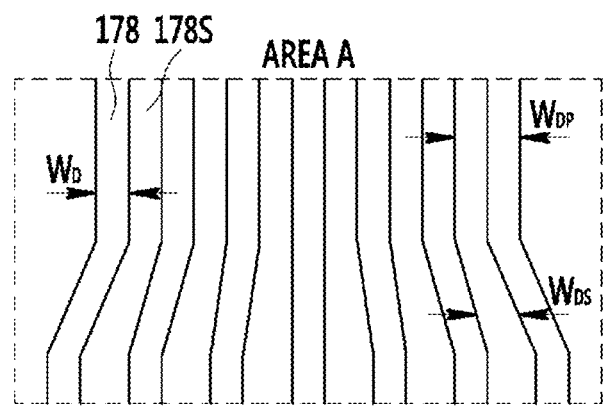
FIG. 4A and FIG. 4B are schematic plan views of a data voltage application wiring area and a common voltage application wiring area, according to one or more exemplary embodiments.
Figure 4B:
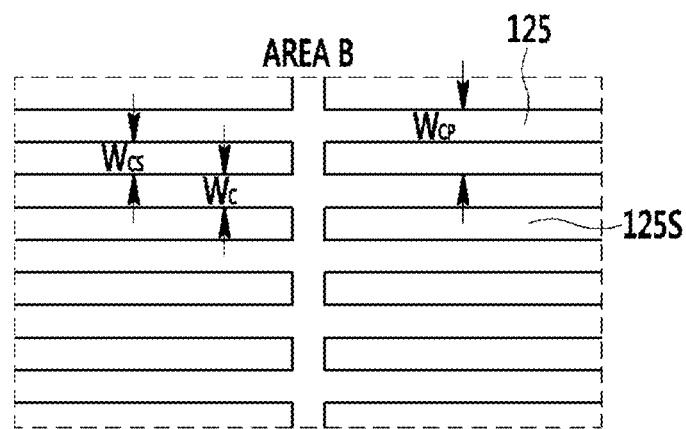

Hereinafter, a liquid crystal display will be described with reference to FIG. 1 to FIG. 4. FIG. 1 is a plan view of a display, according to one or more exemplary embodiments, FIG. 2 is a cross-sectional view of a common voltage application unit, according to one or more exemplary embodiments, FIG. 3 is a cross-sectional view of a data voltage application unit, according to one or more exemplary embodiments, and FIG. 4A and FIG. 4B are schematic plan views of a data voltage application wiring area and a common voltage application wiring area, according to one or more exemplary embodiments.

Liquid crystal display 10 includes lower display panel 100 on which one or more pixels PXs are formed, upper display panel 200 disposed to be opposite to the lower display panel 100 and having common electrode 270 positioned thereon, liquid crystal layer 3 disposed between lower display panel 100 and upper display panel 200, and sealant 400, which bonds lower display panel 100 and upper display panel 200.

Lower display panel 100 includes display area DA having pixels PXs positioned thereon and displaying an image, first peripheral area PA1 surrounding left and upper edges of display area DA, and second peripheral area PA2 surrounding right and lower edges of display area DA. Sealant 400 is formed so as to surround an edge of display area DA.

Display area DA of lower display panel 100 has pixels PXs formed thereon, first peripheral area PA1 has a gate voltage application wiring, a data voltage application wiring, and a common voltage application wiring configured thereon, and second peripheral area PA2 has the common voltage application wiring configured thereon.

Display area DA has gate lines GL1 to GLn and data lines DL1 to DLm. Data lines DL1 to DLm intersect with gate lines GL1 to GLn, which are insulated from data lines DL1 to DLm. Display area DA includes pixels PXs formed in a matrix form by gate lines GL1 to GLn and data lines DL1 to DLm. Each of the pixels may be formed in the same structure, and a description of one pixel will be provided below with reference to FIG. 6 to FIG. 9.

First peripheral area PA1 includes gate voltage application wiring 128 and data voltage application wiring 178. Gate voltage application wiring 128 and data voltage application wiring 178 may be disposed by extending gate lines GL1 to GLn and data lines DL1 to DLm. Gate voltage application wiring 128 includes gate pad 129, which receives a gate signal from a driving circuit (not shown), and data voltage application wiring 178 includes data pad 179, which receives a data signal from a driving circuit (not shown). Gate pad 129 and data pad 179 may be referred to as a signal pad, which provides a signal voltage (a data voltage or a gate voltage). Further, as shown in FIG. 1, one or more pieces of common voltage application wirings 125 may be connected to common voltage pad 127, one or more pieces of data voltage application wirings 178 may be connected to data pad 179, and one or more pieces of gate voltage application wirings 128 may be connected to gate pad 129. Each piece of common voltage application wirings 125 may be referred to as a common voltage application wiring piece. Each piece of gate voltage application wirings 128 may be referred to as a gate voltage application wiring piece. Each piece of data voltage application wirings 178 may be referred to as a data voltage application wiring piece.

Common voltage application wiring 125 and common voltage pad 127 may be positioned between adjacent gate driving chips or between adjacent data driving chips. Common voltage application wiring 125 and common voltage pad 127 may be disposed on the same layer as the layer of gate line 121 (see e.g., FIG. 6) and may be formed by the same process using the same material.

Common voltage pad 127 receives a common voltage signal from the driving circuit (not shown) and transfers the common voltage signal to common voltage application wiring 125, and common voltage application wiring 125 is electrically connected to common electrode 270 through conductive ball 410, or the like so as to transfer common voltage to common electrode 270.

Common voltage application wiring 125 may be disposed on first peripheral area PA1 and may also be disposed on the second peripheral area PA2 positioned on right and left edges of display area DA. Common voltage application wiring 125 disposed on second peripheral area PA2 may extend from common voltage application wiring 125 disposed on first peripheral area PA1, thereby making it possible to transfer the common voltage without separately having common voltage pad 127.

Common voltage application wiring 125 may be formed in any shape for transferring the common voltage, and may also be formed in a lattice form (not shown).

Transparent electrodes 197 and 198 may be disposed on passivation layers 180p and 180q, which are disposed on data voltage application wiring 178. Transparent electrodes 197 and 198 may include a transparent conductive material such as an indium tin oxide (ITO), an indium zinc oxide (IZO), or the like. Transparent electrodes 197 and 198 may contact members, which are in contact with gate pad 129, data pad 179, and common voltage application wiring 125 through the respective contact holes.

Next, upper display panel 200 will be described in more detail.

Upper display panel 200 includes second insulating substrate 210, light blocking member 220, overcoat layer 250, and common electrode 270.

Light blocking member 220 is positioned on second insulating substrate 210 so as to be overlapped with an area on which first and second peripheral areas PA1 and PA2 and sealant 400 are positioned. In addition, light blocking member 220 may be positioned on a non-effective display area of display area DA, such as an area on which a thin film transistor is disposed.

Common electrode 270 may be disposed on light blocking member 220 and may be disposed on overcoat layer 250 that forms a flat layer. In this case, common electrode 270 may receive the common voltage through conductive ball 410 which is in contact with contact member 198 connected to common voltage application wiring 125.

Liquid crystal layer 3 including liquid crystal molecules 31 may be disposed between lower display panel 100 and upper display panel 200. Liquid crystal layer 3 may include liquid crystal molecules 31 and reactive mesogen (RM) (not shown) that assists with pre-tilt of liquid crystal molecules 31.

Further, liquid crystal display 10 may include sealant 400 that bonds lower display panel 100 and upper display panel 200 to each other. Sealant 400 may be a photo-curable material.

According to one or more exemplary embodiments, sealant 400 may be uniformly cured throughout display 10, thereby making it possible to prevent sealant 400 from being infiltrated into liquid crystal layer 3 and reacting with mesogen. The reason is that a light leakage phenomenon due to contamination of liquid crystal layer 3 may occur in a case where liquid crystal layer 3 reacts due to a non-cured portion of sealant 400.

Detailed configurations of data voltage application wiring 178 and common voltage application wiring 125 will be described with reference to FIG. 4A and FIG. 4B.

First, area A on which data voltage application wiring 178 is positioned will be described. Data voltage application slit 178s, which is an empty space positioned between adjacent pieces of data voltage application wirings 178, is positioned in area A.

In this case, data voltage application wiring 178 may have the same width Wd as the width Wds of data voltage application slit 178s. That is, an opening ratio occupied by the data voltage application slit 178s in the corresponding area may be about 50%.

Width Wd of data voltage application wiring 178 may be about 10 μm or less, and consequently, width Wds of data voltage application slit 178s may also be about 10 μm or less. Therefore, the summation Wdp of the widths of data voltage application wiring 178 and data voltage application slit 178s may be about 20 μm or less.

Next, area B on which common voltage application wiring 125 is disposed will be described. Common voltage application slit 125s, which is an empty space formed between adjacent pieces of common voltage application wirings 125, is positioned in area B.

In this case, a ratio of widths of common voltage application wiring 125 and data voltage application wiring 178 may be about 2:1 to 1:1. Therefore, the width of common voltage application wiring 125 may be at least 20 µm or less.

Further, a ratio of width Wc of the common voltage application wiring 125 and a width Wcs of common voltage application slit 125s may be the same. That is, an opening ratio of common voltage application wiring 125 and common voltage application slit 125s in area B may be about 50%.

According to one or more exemplary embodiments, width Wc of common voltage application wiring 125 and width Wd of data voltage application wiring 125 have a ratio of 2:1 to 1:1, and the opening ratios of area A and area B are substantially the same.

According to the above-mentioned wiring width ratio and opening ratio, in a rear exposure for curing the sealant, a diffraction degree of irradiated light occurs to be almost the same in area A on which data voltage application wiring 178 is disposed and area B on which common voltage application wiring 125 is disposed. Therefore, a sealant curing process may be performed by uniformly radiating light on the overall area of display 10, thereby making it possible to prevent contamination of liquid crystal layer 3 that may occur due to a non-curing of a portion of sealant 400.

Figure 5A:
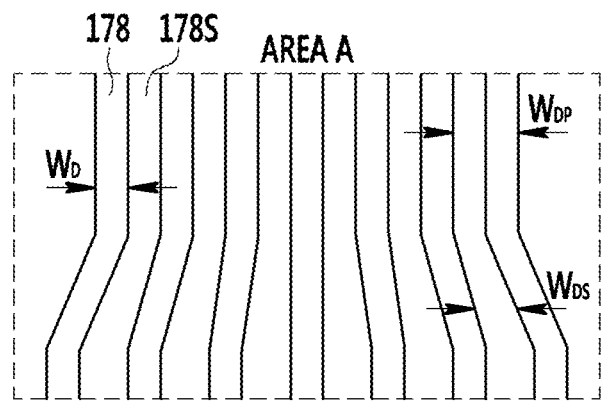
FIG. 5A and FIG. 5B are schematic plan views of a data voltage application wiring area and a common voltage application wiring area, according to one or more exemplary embodiments.
Figure 5B:
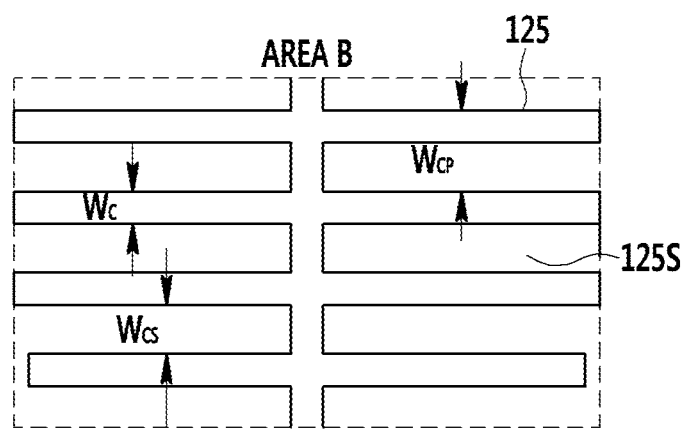

Hereinafter, a liquid crystal display will be described with reference to FIG. 5A and FIG. 5B. FIG. 5A and FIG. 5B are schematic plan views of a data voltage application wiring area and a common voltage application wiring area, according to one or more exemplary embodiments. In describing the liquid crystal display, a description of components that are identical or similar to those illustrated in the above description will be omitted for conciseness.

First, area A on which data voltage application wiring 178 is disposed will be described. Data voltage application slit 178s, which is an empty space positioned between adjacent pieces of data voltage application wirings 178, is positioned in area A.

In this configuration, data voltage application wiring 178 may have the same width Wd as width Wds of data voltage application slit 178s. That is, width Wd of data voltage application wiring 178 may be about 10 µm or less, and consequently, width Wds of data voltage application slit 178s may also be about 10 µm or less. Therefore, the summation of the widths of data voltage application wiring 178 and data voltage application slit 178s may be about 20 µm or less.

According to those described above, an opening ratio occupied by data voltage application slit 178s in area A may be about 50%.

Next, area B on which common voltage application wiring 125 is disposed will be described. Common voltage application slit 125s, which is an empty space formed between adjacent pieces of common voltage application wirings 125, is positioned in area B.

In this configuration, the summation of widths of one common voltage application wiring 125 and one common voltage application slit 125s may be about 40 µm to 60 µm, a ratio occupied by the width of common voltage application slit 125s may be about 70% or more. The width of common voltage application wiring 125 corresponds to a portion positioned between two adjacent common voltage application slits 125s.

For example, if the ratio of the width of common voltage application slit 125s and common voltage application wiring 125, e.g., the opening ratio, is about 70%, the width of common voltage application slit 125s may be about 28 µm to 42 µm, and the width of common voltage application wiring 125 may be about 12 µm to 18 µm. Therefore, as the ratio changes, at least one of the widths of common voltage application slit 125s and common voltage application wiring 125 are also changed.

According to one or more exemplary embodiments described above, an opening ratio of area A on which data voltage application wiring 178 is disposed, is about 50%, but an opening ratio of area B on which common voltage application wiring 125 is disposed, is about 70% or more.

According to one or more exemplary embodiments, light radiated for the rear exposure is uniformly diffracted in area A on which data voltage application wiring 178 is disposed or area B on which common voltage application wiring 125 is disposed. Therefore, since sealant 400 is uniformly cured by the above-mentioned light, it is possible to prevent or reduce liquid crystal layer 3 from being contaminated by non-cured sealant. Display apparatuses having such configurations may also have improved screen quality and reliability.

The common voltage application wiring area described with reference to FIGS. 4A, 4B, 5A, and 5B may be generally formed on first peripheral area PA1 and second peripheral area PA2 of display 10, but aspects are not limited thereto. For example, and the common voltage application wiring area may be formed on only first peripheral area PA1. If second peripheral area PA2 has only the common voltage application wiring positioned thereon, second peripheral area PA2 has lower possibility of a non-uniform curing occurrence.

Figure 6:
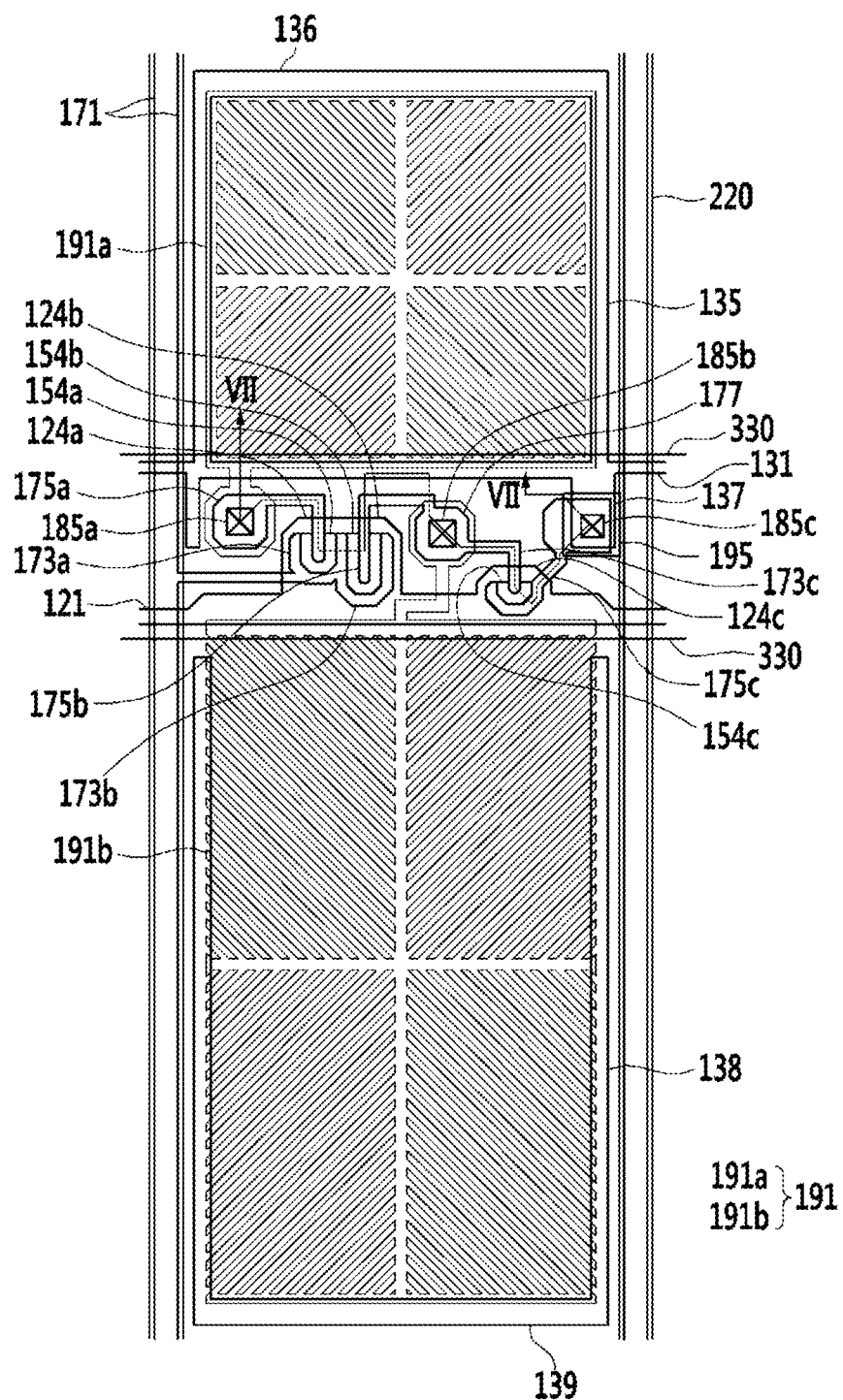
FIG. 6 is a plan view of one pixel of a display, according to one or more exemplary embodiments.
Figure 8:
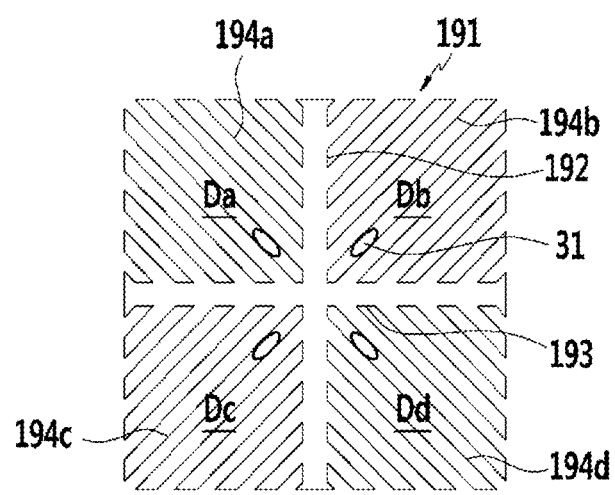
FIG. 8 is a plan view of a basic pixel electrode, according to one or more exemplary embodiments.
Figure 9:
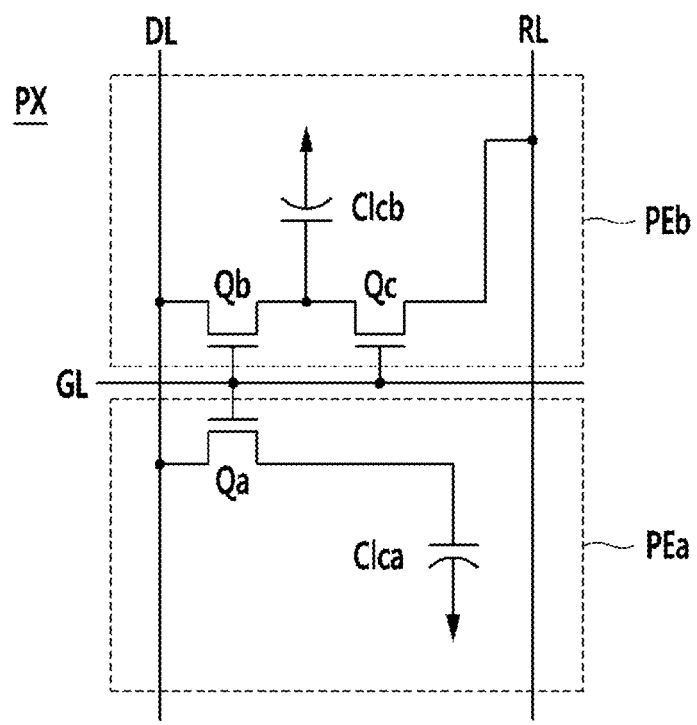
FIG. 9 is a circuit diagram of one pixel, according to one or more exemplary embodiments.

Hereinafter, a display configuration will be described with reference to FIG. 6 to FIG. 9. FIG. 6 is a plan view of one pixel of a display, according to one or more exemplary embodiments, FIG. 7 is a cross-sectional view taken along the line VII-VII of FIG. 6, according to one or more exemplary embodiments, FIG. 8 is a plan view of a basic pixel electrode, according to one or more exemplary embodiments, and FIG. 9 is a circuit diagram of one pixel, according to one or more exemplary embodiments.

Figure 7:
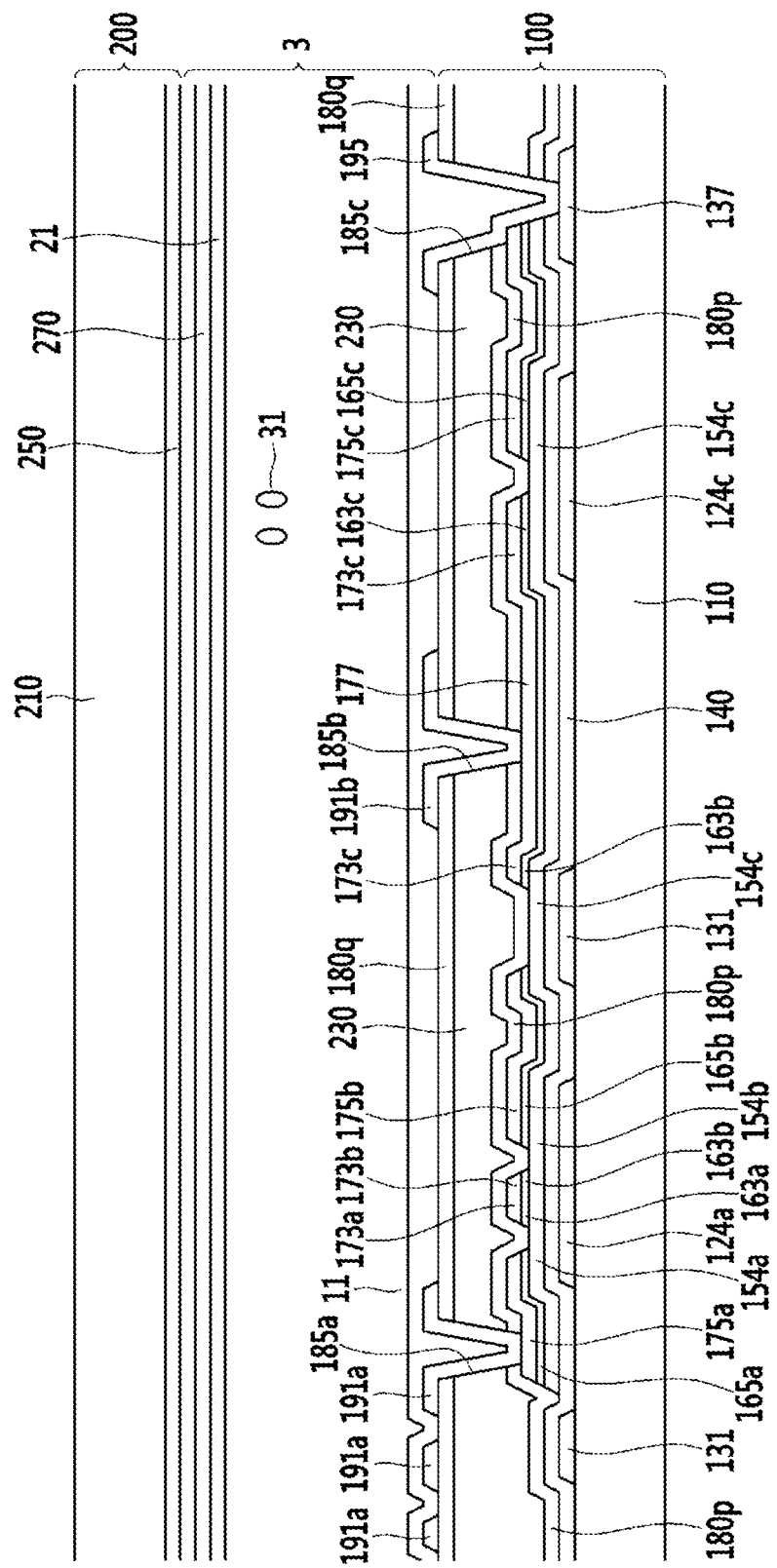
FIG. 7 is a cross-sectional view taken along the line VII-VII of FIG. 6, according to one or more exemplary embodiments.

First, referring to FIG. 6 and FIG. 7, the liquid crystal display includes lower display panel 100 and upper display panel 200 that face each other, liquid crystal layer 3 interposed between display panels 100 and 200, and a pair of polarizers (not shown) attached on outer surfaces of display panels 100 and 200.

First, lower display panel 100 will be described in more detail.

A gate conductor including gate line 121 and voltage dividing reference voltage line 131 is positioned on first insulating substrate 110, which includes a transparent material, e.g., transparent glass, plastic, or the like.

Gate line 121 includes first gate electrode 124a, second gate electrode 124b, third gate electrode 124c, and wide end portion (not shown) for allowing a connection with other layers or external driving circuits.

Voltage dividing reference voltage line 131 includes first sustain electrodes 135 and 136, and reference electrode 137. There are second sustain electrodes 138 and 139, which are not connected to voltage dividing reference voltage line 131, but are overlapped with second sub-pixel electrode 191b.

Gate insulating layer 140 may be disposed on gate line 121 and voltage dividing reference voltage line 131. First semiconductor layer 154a, second semiconductor layer 154b, and third semiconductor layer 154c may be disposed on gate insulating layer 140. Ohmic contacts 163a, 165a, 163b, 165b, 163c, and 165c may be disposed on semiconductor layers 154a, 154b, and 154c.

Data conductor including date lines 171 connected to or including first source electrode 173a and second source electrode 173b, first drain electrode 175a, second drain electrode 175b, third source electrode 173c, and third drain electrode 175c may be disposed on ohmic contacts 163a, 165a, 163b, 165b, 163c, and 165c, and gate insulating layer 140.

The data conductor, and ohmic contacts 163a, 165a, 163b, 165b, 163c, and 165c and semiconductor layers 154a, 154b, and 154c disposed therebelow may be simultaneously formed using one mask and have substantially the same plane shape.

Data line 171 may include a wide end portion (not shown) for allowing a connection with other layers or external driving circuits.

First gate electrode 124a, first source electrode 173a, and first drain electrode 175a are parts of first thin film transistor (TFT) Qa together with first land-type semiconductor layer 154a, and a channel of thin film transistor Qa is formed in semiconductor layer 154a between first source electrode 173a and first drain electrode 175a. Similarly, second gate electrode 124b, second source electrode 173b, and second drain electrode 175b are parts of second thin film transistor Qb together with second land-type semiconductor layer 154b, a channel of thin film transistor Qb is formed in semiconductor layer 154b between second source electrode 173b and second drain electrode 175b. Further, third gate electrode 124c, third source electrode 173c, and third drain electrode 175c are parts of third thin film transistor Qc together with third land-type semiconductor layer 154c, and a channel of thin film transistor Qc is formed in third semiconductor layer 154c between third source electrode 173c and third drain electrode 175c.

Second drain electrode 175b may be connected to third source electrode 173c and includes an expansion portion 177 which is widely expanded.

First passivation layer 180p may be disposed on portions of data conductors 171, 173c, 175a, 175b, and 175c and exposed semiconductor layers 154a, 154b, and 154c. First passivation layer 180p may include an inorganic insulating layer, such as silicon nitride, silicon oxide, or the like. First passivation layer 180p may prevent pigment of color filter 230 from being introduced into the portions of exposed semiconductor layers 154a, 154b, and 154c.

Color filter 230 may be disposed on first passivation layer 180p. Color filter 230 may extend in a vertical direction along two data lines which are adjacent to each other.

Second passivation layer 180q may be disposed on color filter 230.

Second passivation layer 180q may include an inorganic insulating layer such as silicon nitride, silicon oxide, or the like. Second passivation layer 180q prevents or reduces defects, such as an afterimage which may be displayed upon driving a screen, by preventing color filter 230 from being delaminated and suppressing contamination of liquid crystal layer 3 by an organic material, such as a solvent introduced from color filter 230.

First passivation layer 180p and second passivation layer 180q have first contact hole 185a and second contact hole 185b to expose first drain electrode 175a and second drain electrode 175b.

First passivation layer 180p, second passivation layer 180q, and gate insulating layer 140 have third contact hole 185c to expose a portion of reference electrode 137 and a portion of third drain electrode 175c. Third contact hole 185c may be covered by connecting member 195. Connecting member 195 electrically connects reference electrode 137 and third drain electrode 175c, which are exposed through third contact hole 185c.

Pixel electrodes 191 may be disposed on second passivation layer 180q. Respective pixel electrodes 191 may be separated from each other, having gate line 121 therebetween to include first sub-pixel electrode 191a and second sub-pixel electrode 191b which are adjacent to each other along a column direction based on gate line 121.

Pixel electrode 191 may include a transparent material such as an ITO, an IZO, or the like. Pixel electrode 191 may also include a transparent conductive material, such as an ITO, an IZO, or the like, or a reflective metal, such as aluminum, silver, chromium, or an alloy thereof.

First sub-pixel electrode 191a and second sub-pixel electrode 191b each include one or more of basic electrode 191 shown in FIG. 5 and a modification thereof.

First sub-pixel electrode 191a and second sub-pixel electrode 191b are physically and electrically connected to first drain electrode 175a and second drain electrode 175b, respectively, through first contact hole 185a and second contact hole 185b, respectively, and are applied with a data voltage from first drain electrode 175a and second drain electrode 175b, respectively. In this configuration, a portion of the data voltage applied to second drain electrode 175b may be divided by third source electrode 173c, such that magnitude of the voltage applied to first sub-pixel electrode 191a is larger than magnitude of the voltage applied to second sub-pixel electrode 191b.

First sub-pixel electrode 191a and second sub-pixel electrode 191b to which the data voltage is applied generate an electrical field together with common electrode 270 of upper display panel 200 to determine a direction of the liquid crystal molecule of liquid crystal layer 3 disposed between two electrodes 191 and 270. Luminance of light passing through liquid crystal layer 3 is changed depending on the direction of the liquid crystal molecule determined as described above.

First alignment layer 11 may be disposed on pixel electrode 191. First alignment layer 11 may be a vertical alignment layer.

Alignment layers 11 and 21 are liquid crystal alignment layers such as polyamic acid, polyimide, or the like, and may be formed to include at least one of materials which are generally used.

Next, upper display panel 200 will be described.

Light blocking member 220 is positioned on insulating substrate 210. Light blocking member 220 may also be called black matrix BM. Light blocking member 220 may extend along data line 171 and may be disposed between two adjacent color filters 230.

Light blocking member 220 may be disposed to cover an area on which first transistor Qa, second transistor Qb, and third transistor Qc are disposed, and may extend in the same direction as gate line 121.

Overcoat layer 250 is disposed on light blocking member 220 and common electrode 270 is formed on overcoat layer 250. Second alignment layer 21 may be disposed on common electrode 270. Second alignment layer 21 may be a vertical alignment layer and may include the same material as first alignment layer 11 described above.

The present specification describes exemplary embodiments in which color filter 230 is disposed on lower display panel 100 and light blocking member 220 is disposed on upper display panel 200, but aspects are not limited thereto. For example, color filter 230 and light blocking member 220 may also be disposed on upper display panel 200 or may also be disposed on lower display panel 100.

Liquid crystal layer 3 has negative dielectric anisotropic and may include a liquid crystal composition having negative dielectric anisotropic described above. Liquid crystal molecules 31 of liquid crystal layer 3 are aligned so that long sides thereof are perpendicular to surfaces of two display panels 100 and 200 in a state in which the electric field is not present.

Further, liquid crystal layer 3 may include a compound such as monomer or the like which can be cured by polymerization by light such as ultraviolet rays, or the like. The compound may be the reactive mesogen polymerized by light such as ultraviolet rays, or the like.

The above-mentioned reactive mesogen may be polymerized depending on a manufacturing process to form a polymer, and liquid crystal molecules 31 are aligned so as to have a pre-tile by the polymer.

Display 10 may be mounted by a housing including a narrow bezel, and the bezel may have a width of about 10 mm or less.

Next, basic electrode 191 will be described with reference to FIG. 8.

As shown in FIG. 8, basic electrode 191 has an overall shape of a quadrangular shape, and includes a cross stem portion including horizontal stem portion 193 and vertical stem portion 192 perpendicular to horizontal stem portion 193. In addition, basic electrode 191 includes first sub-region Da, second sub-region Db, third sub-region Dc, and fourth sub-region Dd which are distinguished based on horizontal stem portion 193 and vertical stem portion 192, and first fine branch portions 194a, second fine branch portions 194b, third fine branch portions 194c, and fourth fine branch portions 194d are positioned in the respective sub-regions Da to Dd.

First fine branch portion 194a is obliquely extended in a left upward direction from horizontal stem portion 193 or vertical stem portion 192, and second fine branch portion 194b is obliquely extended in a right upward direction from horizontal stem portion 193 or vertical stem portion 192. In addition, third fine branch portion 194c is obliquely extended in a left downward direction from horizontal stem portion 193 or vertical stem portion 192, and fourth fine branch portion 194d is obliquely extended in a right downward direction from horizontal stem portion 193 or vertical stem portion 192.

In this configuration, sides of first to fourth fine branch portions 194a, 194b, 194c, and 194d may distort the electric field, forming a horizontal component that determines an oblique direction of liquid crystal molecules 31. The horizontal component of the electric field is approximately parallel to the sides of first to fourth fine branch portions 194a, 194b, 194c, and 194d. Therefore, as shown in FIG. 8, liquid crystal molecules 31 are tilted in a direction parallel to a length direction of fine branch portions 194a, 194b, 194c, and 194d. Since the length directions of fine branch portions 194a, 194b, 194c, and 194d include different four sub-regions Da to Dd, one pixel electrode 191 has approximately four directions in which liquid crystal molecules 31 are tilted, and four regions having different alignment directions of liquid crystal molecules 31 are formed on liquid crystal layer 3. As such, in a configuration where the tilted directions of the liquid crystal molecules are variously formed, a reference viewing angle of the liquid crystal display is increased.

Since the above-mentioned display has a circuit diagram shown in FIG. 9, a description thereof will be provided below.

The liquid crystal display according to one or more exemplary embodiments includes signal lines including gate line GL transferring a gate signal, data line DL transferring a data signal, and voltage dividing reference voltage line RL transferring a voltage dividing reference voltage, and first, second and third switching elements Qa, Qb, and Qc and first and second liquid crystal capacitors Clca and Clcb, which are connected to the signal lines.

First and second switching elements Qa and Qb are each connected to gate line GL and data line DL, and third switching element Qc is connected to an output terminal of second switching element Qb and voltage dividing reference voltage line RL.

First switching element Qa and second switching element Qb, which are the three-terminal element of a thin film transistor or the like, have a control terminal connected to gate line GL and an input terminal connected to data line DL, an output terminal of first switching element Qa is connected to first liquid crystal capacitor Clca, and an output terminal of switching element Qb is connected to second liquid crystal capacitor Clab and an input terminal of third switching element Qc.

Third switching element Qc, which is also the three-terminal element of the thin film transistor or the like, has a control terminal connected to gate line GL, an input terminal connected to second liquid crystal capacitor Clab, and an output terminal connected to voltage dividing reference voltage line RL.

When a gate ON signal is applied to gate line GL, first switching element Qa, second switching element Qb, and third switching element Qc, which are connected to gate line GL are turned on. Consequently, a data voltage applied to data line DL is applied to first sub-pixel electrode PEa and second sub-pixel electrode PEb through first switching element Qa and second switching element Qb which are turned on. In this state, the data voltages applied to first sub-pixel electrode PEa and second sub-pixel electrode PEb may be equal to each other, and first liquid crystal capacitor Clca and second liquid crystal capacitor Clcb are charged with the same value as a difference between a common voltage and the data voltage. The voltage charged in second liquid crystal capacitor Clcb is divided by third switching element Qc which is turned on. Further, the voltage value charged in second liquid crystal capacitor Clcb decreases by the difference between the common voltage and the voltage dividing reference voltage. That is, the voltage charged in first liquid crystal capacitor Clca is higher than the voltage charged in second liquid crystal capacitor Clcb.

As such, the voltage charged in first liquid crystal capacitor Clca and the voltage charged in second liquid crystal capacitor Clcb are different from each other. Since the voltage of first liquid crystal capacitor Clca and the voltage of second liquid crystal capacitor Clcb are different from each other, the tilted angles of the liquid crystal molecules in first sub-pixel electrode 191a and second sub-pixel electrode 191b are different, such that luminance levels of the two sub-pixels are different. Therefore, when the voltage of first liquid crystal capacitor Clca and the voltage of second liquid crystal capacitor Clcb are appropriately adjusted, it may be possible to maximally match an image viewed from the side to an image viewed from the front, such that side visibility can be improved.

Although one or more exemplary embodiments include third switching element Qc connected to second liquid crystal capacitor Clcb and voltage dividing reference voltage line RL in order to allow the voltage charged in first liquid crystal capacitor Clca and the voltage charged in second liquid crystal capacitor Clcb to be different, second liquid crystal capacitor Clcb may be connected to a step-down capacitor in the liquid crystal display according to a different configuration.

Specifically, in the configuration employing the step-down capacitor, a third switching element may include a first terminal connected to a step-down gate line, a second terminal connected to second liquid crystal capacitor Clcb, a third terminal connected to the step-down capacitor. In this configuration, some of electric charge charged in second liquid crystal capacitor Clcb is charged in the step-down capacitor such that a charged voltage between first liquid crystal capacitor Clca and second liquid crystal capacitor Clcb may be set to be different from each other. Further, first liquid crystal capacitor Clca and second liquid crystal capacitor Clcb may be connected to data lines different from each other so that first liquid crystal capacitor Clca and second liquid crystal capacitor Clcb are applied with data voltages different from each other, such that the charged voltage between first liquid crystal capacitor Clca and second liquid crystal capacitor Clcb may also be set to be different from each other.

The charged voltage between first liquid crystal capacitor Clca and second liquid crystal capacitor Clcb may also be set to be different from each other by other configurations and methods, in addition to the above-mentioned methods.

The circuit diagram for one pixel region has been described with reference to FIG. 9, but aspects are not limited thereto, and various circuits may be applied to one or more pixel regions.

Figure 10:
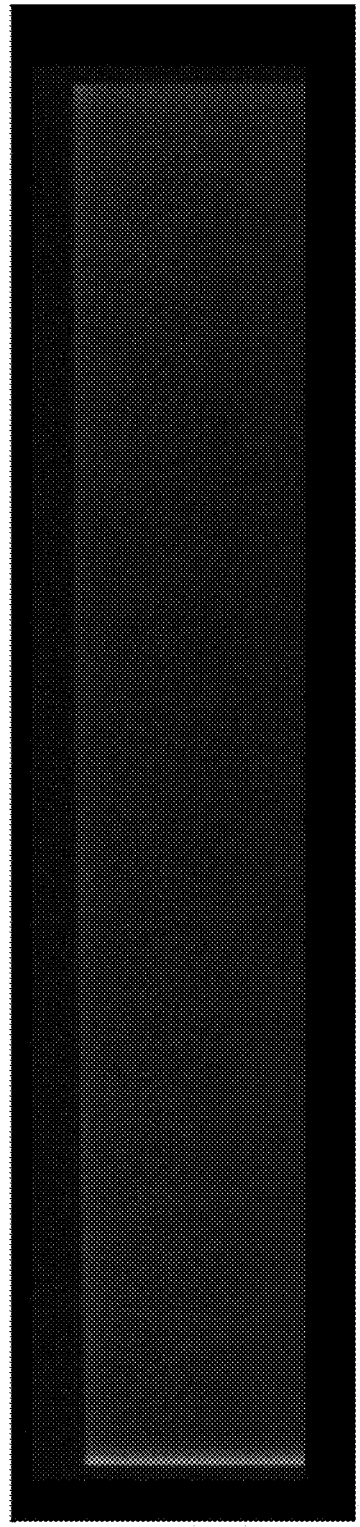
FIG. 10 is an example of an image illustrating whether light is leaked for a portion of the display, according to one or more exemplary embodiments.
Figure 12:
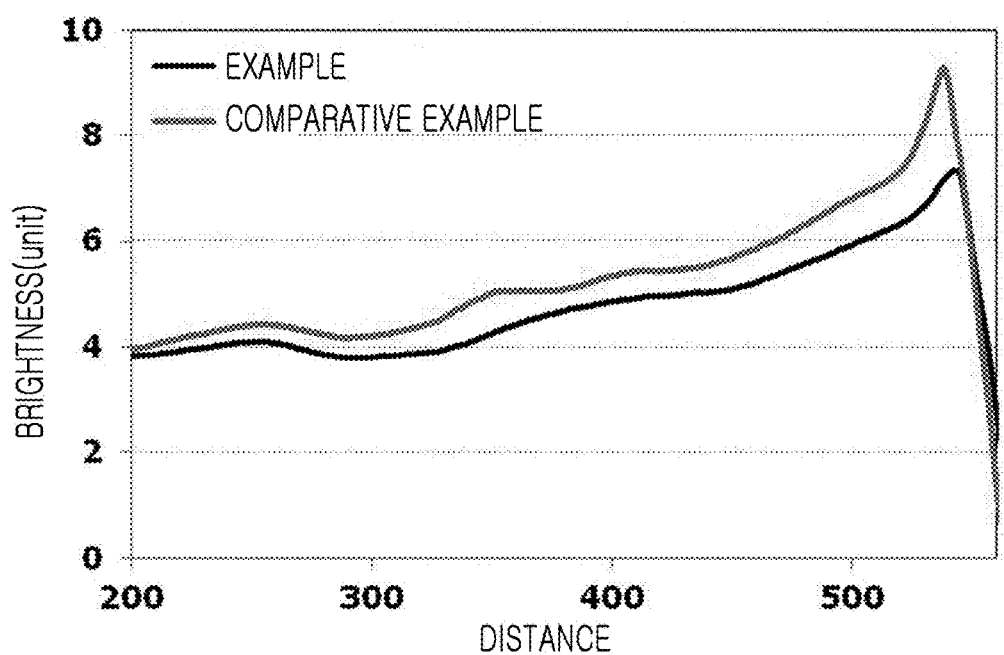
FIG. 12 is a graph showing a degree of light leakage for the example and the comparative example illustrated in FIG. 10 and FIG. 11, respectively.
Figure 13:
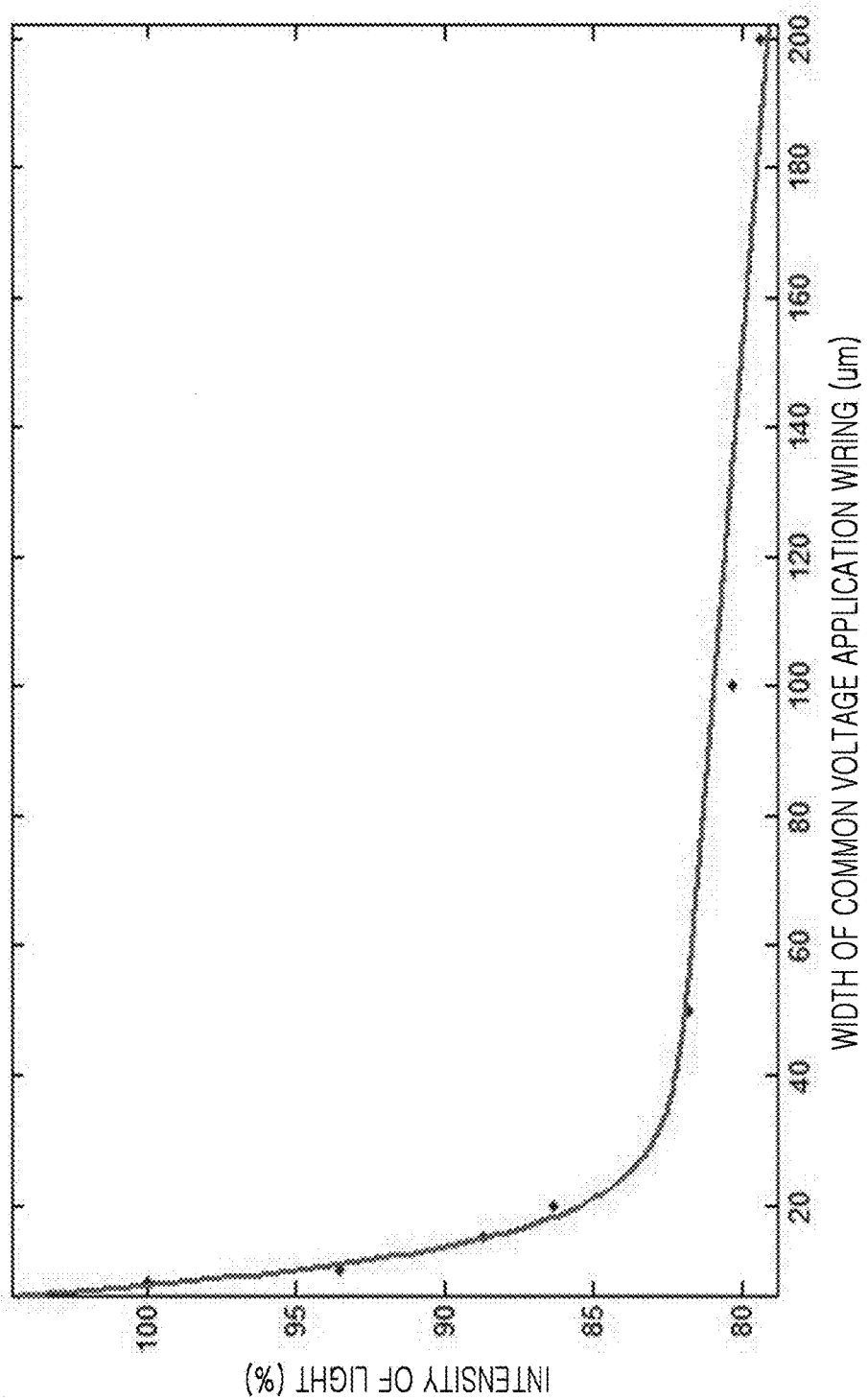
FIG. 13 is a light intensity graph relating to a width of a common voltage application wiring, according to one or more exemplary embodiments.
Figure 14:
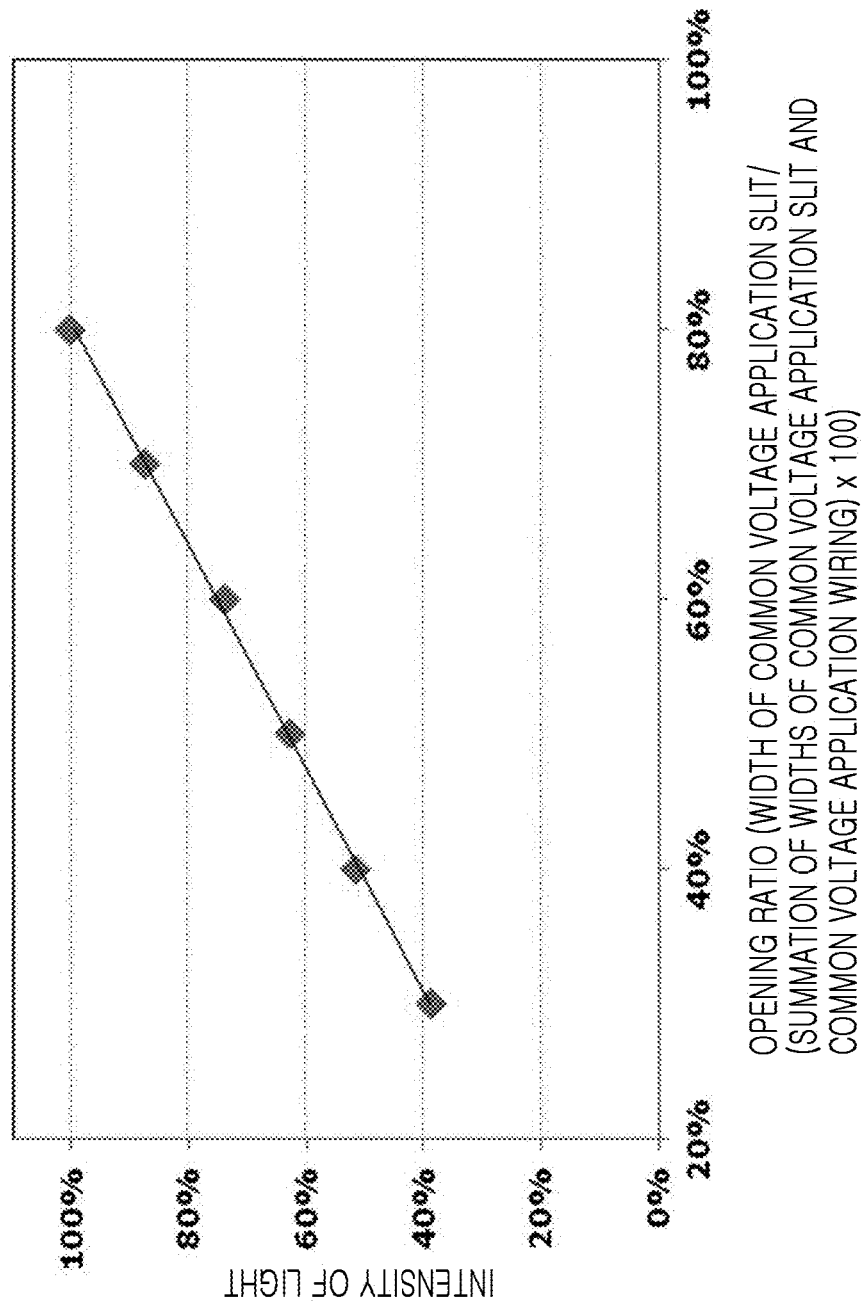
FIG. 14 is a light intensity graph relating to an opening ratio of a common voltage application wiring area, according to one or more exemplary embodiments.
Figure 15:
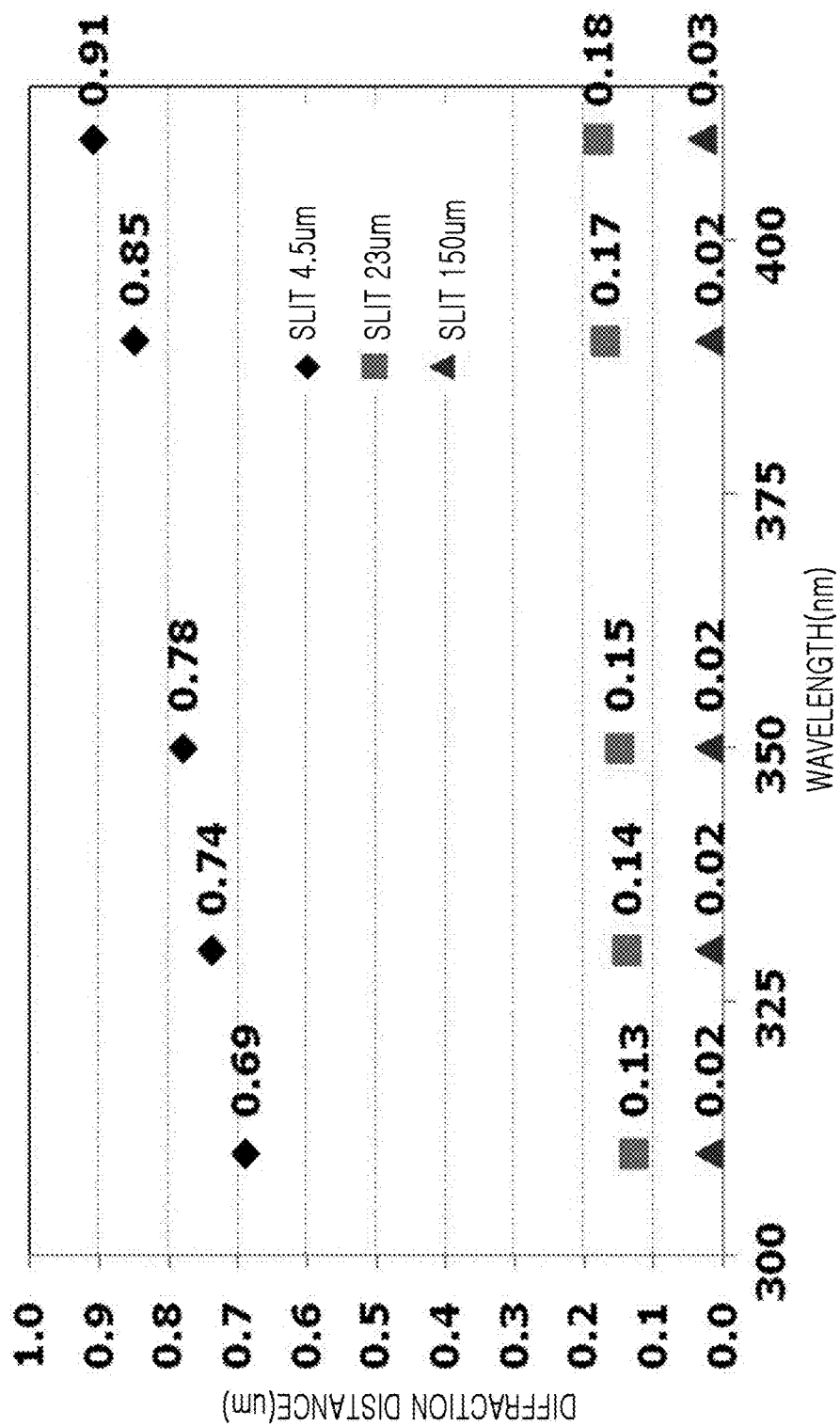
FIG. 15 is a graph showing a diffraction degree relating to a width of a slit, according to one or more exemplary embodiments.

Hereinafter, a light leakage phenomenon of a liquid crystal display and a light leakage reduction according to one or more exemplary embodiments will be described with reference to FIG. 10 to FIG. 15. FIG. 10 is an example of an image illustrating whether light is leaked for a portion of the display, according to one or more exemplary embodiments, FIG. 11 is an image illustrating whether light is leaked for a portion of the display, according to a comparative example, FIG. 12 is a graph showing a degree of light leakage for the example and the comparative example illustrated in FIG. 10 and FIG. 11, respectively, FIG. 13 is a light intensity graph relating to a width of a common voltage application wiring, according to one or more exemplary embodiments, FIG. 14 is a light intensity graph relating to an opening ratio of a common voltage application wiring area, according to one or more exemplary embodiments, and FIG. 15 is a graph showing a diffraction degree relating to a width of a slit, according to one or more exemplary embodiments.

Referring to FIG. 10, FIG. 10 shows an image indicating a degree of light leakage of a liquid crystal display device in which widths of a data voltage application wiring and a common voltage application wiring and widths of a data voltage application slit and a common voltage application slit are the same as each other.

In other words, FIG. 10 illustrates a configuration, according to an exemplary embodiment illustrated above, in which a ratio of the widths of the data voltage application wiring and the common voltage application wiring is 1:1. As shown in FIG. 10, which indicates whether a light leakage phenomenon occurs, additional light leakage did not occur.

Figure 11:
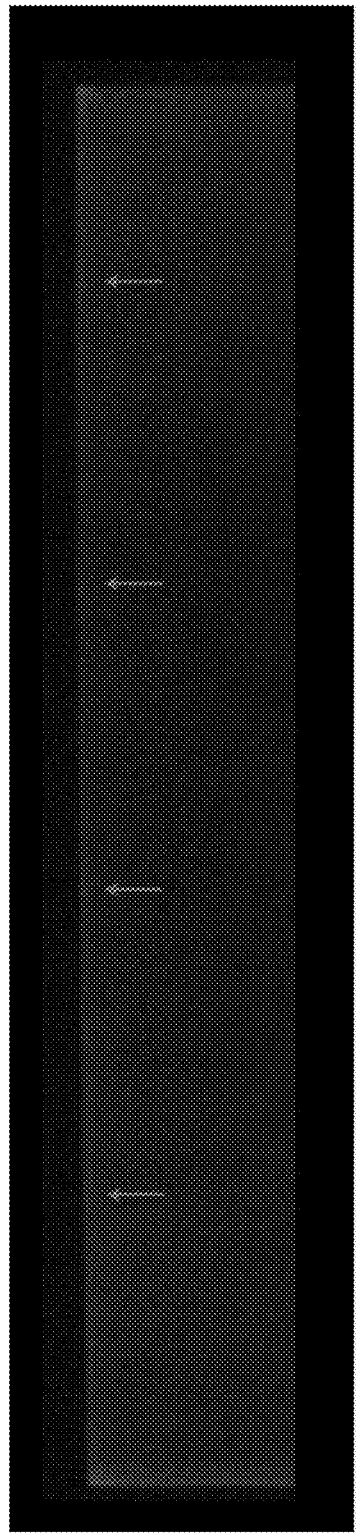
FIG. 11 is an image illustrating whether light is leaked for a portion of the display, according to a comparative example.

FIG. 11 shows a case in which area A on which the data voltage application wiring is disposed and area B on which the common voltage application wiring is disposed have the same opening ratio (the opening ratio of 50%), but the common voltage application wiring has the width larger than that of the data voltage application wiring. Specifically, FIG. 11 illustrates a configuration in which a ratio of the widths of the data voltage application slit and the common voltage application slit (or a ratio of the widths of the data voltage application wiring and the common voltage application wiring) is 1:5.

In the configuration of FIG. 11, an additional light leakage phenomenon occurs at the same interval in areas B on which the common voltage application wiring is disposed as indicated by arrows illustrated in FIG. 11.

In the case in which the common voltage application wiring and the data voltage application wiring have the same opening ratio and the common voltage application wiring has the width larger than that of the data voltage application wiring, a non-curing portion of sealant 400 exists in area B on which the common voltage application wiring is disposed, and as a result, contamination of the liquid crystal layer and the light leakage phenomenon occurs.

The degree of light leakage described with respect to FIG. 10 and FIG. 11 may be more accurately confirmed through the graph of FIG. 12. In the display configuration according to the comparative example, a degree of an edge light leakage is higher than that of the display configuration corresponding to the example illustrated in FIG. 10.

Hereinafter, three examples will be described and compared in detail with reference to Table 1 below. Example 1 corresponds to a configuration in which the data voltage application wiring area has the opening ratio of about 50%, the common voltage application wiring area has the opening ratio of about 50%, and the ratio of the widths of the common voltage application slit and the data voltage application slit is about 3.8:1. In Example 1, it has been confirmed that the light leakage phenomenon occurs.

Example 2 corresponds to a configuration in which the common voltage application wiring area and the data voltage application wiring area have almost the same opening ratio and the ratio of the widths of the common voltage application slit and the data voltage application slit is about 1.92:1. In Example 2, it has been confirmed that the light leakage phenomenon does not occur.

Example 3 corresponds to a configuration in which the common voltage application wiring area and the data voltage application wiring area have almost the same opening ratio and the ratio of the widths of the common voltage application slit and the data voltage application slit is about 1:1. In Example 3, it has been also confirmed that the light leakage phenomenon does not occur.

In other words, in a configuration in which the common voltage application wiring area and the data voltage application wiring area have substantially the same opening ratio, the light leakage phenomenon does not occur when the ratio of the widths of the common voltage application slit and the data voltage application slit is about 2:1 to 1:1.

TABLE 1

|  | Example 1 | Example 2 | Example 3 |
|---|---|---|---|
| Width of Data Voltage Application Wiring/Slit (μm) | 4/6.6 | 4/6 | 30/40 |
| Width of Common Voltage Application Wiring/Slit (μm) | 25/25 | 8.5/11.5 | 30/40 |
| Light Leakage | Occur | Not occur | Not occur |
| Ratio of Slit | 3.8:1 | 1.92:1 | 1:1 |
| Intensity of Light | 81.7% | 88.7% | 100% |

Further, Table 1 indicates that the light leakage phenomenon does not occur in cases in which intensity of light is about 88% or more. Based on the foregoing description, the case in which the sum of the widths of the data voltage application wiring and slit (a pitch of the data voltage application wiring) and the sum of the widths of the common voltage application wiring and slit (a pitch of the common voltage application wiring) are different will be described in more detail with reference to FIG. 13 and FIG. 14.

In order to remove or reduce the light leakage phenomenon, Table 1 shows that the intensity of light should be controlled to be about 88% or more. Referring to FIG. 13, the width of the common voltage application wiring needs to be about 20 µm or less. Further, referring to FIG. 14, an opening ratio (the width of a common voltage application slit/(the summation of widths of the common voltage application slit and a common voltage application wiring)×100) needs to be about 70% or more to provide the light intensity of about 88% or more.

In other words, in order to control the width of the common voltage application wiring to be almost the same as the width of the data voltage application wiring, the width of the common voltage application slit is increased and the width of the common voltage application wiring is decreased. In such a configuration, the opening ratio of the common voltage application wiring area becomes larger than the opening ratio of the data voltage application wiring area.

Next, as shown in FIG. 15, in the case in which the opening ratio (a ratio of the width of a slit and the summation of the widths (pitch) of a wiring and the slit) is the same, a diffraction degree decreases as the width of the slit increases. Thus, in the case in which a rear exposure is performed to cure sealant 400, diffraction hardly occurs in a case in which the width of the slit is relatively large, and as a result, it is difficult to cure sealant 400 uniformly.

Therefore, by configuring the data voltage application wiring area and the common voltage application wiring area to have the same opening ratio and decreasing the width of the common voltage application slit as illustrated in one or more exemplary embodiments, it may be possible to provide more uniform curing of a sealant, e.g., sealant 400, throughout a display area.

According to one or more exemplary embodiments, in the sealant curing process by the rear exposure, diffraction degrees of radiated light are almost the same in the area on which the common voltage application wiring is disposed and the area on which the data voltage application wiring is disposed. Because the widths of the data voltage application wiring and the common voltage application wiring are almost the same or the opening ratio of the common voltage application wiring area is increased, the diffraction uniformly occurs. Therefore, it may be possible to uniformly cure a sealant on the overall area of a display and prevent contamination of a liquid crystal layer that may occur due to a non-curing of the sealant. As a result, the above-mentioned display may also have improved screen quality and reliability.

According to other wiring structures, common voltage wiring application slits and data voltage application slits have different thicknesses, thereby causing different light diffractions and a non-cured portion of a sealant. However, one or more exemplary embodiments provide a liquid crystal display having common voltage wiring application pieces and data voltage application wiring pieces with slit structures so that the common voltage wiring application pieces and data voltage application wiring pieces provide uniform light diffractions and a sealant is uniformly cured in areas corresponding to the common voltage wiring application pieces and data voltage application wiring pieces.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
   a display area comprising pixels;
   a peripheral area disposed to surround the display area;
   a first common voltage application wiring configured to transfer a common voltage;
   a second common voltage application wiring adjacent to the first common voltage application wiring and configured to transfer the common voltage;
   a common voltage application slit comprising a space between the first and second common voltage application wirings;
   a first data voltage application wiring configured to transfer a data voltage; and
   a second data voltage application wiring adjacent to the first data voltage application wiring and configured to transfer a data voltage;
   a data voltage application slit comprising a space between the first and second data voltage application wirings,
   wherein a ratio of a width of the common voltage application slit and a width of one of the first and second common voltage application wirings is larger than a ratio of a width of the data voltage application slit and a width of one of the first and second data voltage application wirings.

2. The liquid crystal display of claim 1, wherein:
   a sum of the width of the one of the first and second common voltage application wirings and the width of the common voltage application slit is 40 µm to 60 µm.

3. The liquid crystal display of claim 2, wherein:
   a sum of the width of one of the first and second data voltage application wirings and the width of the data voltage application slit is less than or equal to 20 µm.

4. The liquid crystal display of claim 3, wherein:
   the width of the one of the first and second data voltage application wirings and the width of the data voltage application slit are substantially same.

5. The liquid crystal display of claim 1, wherein:
   the width of the one of the first and second common voltage application wirings is 30% or less of the sum of the width of the one of the first and second common voltage application wirings and the width of the common voltage application slit.

6. The liquid crystal display of claim 5, wherein:
   a ratio of the width of the common voltage application slit and the width of the one of the first and second common voltage application wirings disposed on at least one area in the peripheral area is same as the ratio of the width of the data voltage application slit and the width of the one of the first and second data voltage application wirings.

7. The liquid crystal display of claim 1, further comprising:
   a lower display panel comprising a thin film transistor and a pixel electrode connected to the thin film transistor;
   an upper display panel comprising a common electrode; and
   a sealant to bond the lower display panel and the upper display panel to each other.

8. The liquid crystal display of claim 1, wherein:
the peripheral area comprises the first and second common voltage application wirings and the first and second data voltage application wirings.

9. A liquid crystal display, comprising:
a display area comprising pixels;
a peripheral area comprising a signal pad and a common voltage pad;
common voltage application wiring pieces configured to transfer a common voltage, the common voltage application wiring pieces being connected to the common voltage pad;
a common voltage application slit, which is a space between two adjacent common voltage application wiring pieces;
signal voltage application wiring pieces configured to transfer a signal voltage, the signal voltage application wiring pieces being connected to the signal pad; and
a signal voltage application slit, which is a space between two adjacent signal voltage application wiring pieces,
wherein a ratio of a width of the common voltage application slit and a width of one of the common voltage application wiring pieces is larger than a ratio of a width of the signal voltage application slit and a width of one of the signal voltage application wiring pieces.

10. The liquid crystal display of claim 9, wherein:
the signal pad comprises a data pad;
the signal voltage application wiring pieces comprise data voltage application wiring pieces configured to transfer the data voltage from the data pad to data lines connected to the data voltage application wiring pieces.

11. The liquid crystal display of claim 10, wherein:
the signal pad comprises a gate pad connected to gate voltage application wiring pieces configured to transfer the gate voltage from the gate pad to gate lines connected to the gate voltage application wiring pieces; and
the gate lines are substantially perpendicular to the data lines.

12. The liquid crystal display of claim 11, wherein:
the common voltage pad is disposed between two data pads.

* * * * *